(12) United States Patent
Alhussan (10) Patent No.: US 11,338,909 B1
(45) Date of Patent: May 24, 2022

(54) FLOW SEPARATION CONTROL DEVICE FOR AN AIRFOIL

(71) Applicant: Khaled Abdullah Alhussan, Riyadh (SA)

(72) Inventor: Khaled Abdullah Alhussan, Riyadh (SA)

( * ) Notice: Subject to any disclaimer, the term of this patent is extended or adjusted under 35 U.S.C. 154(b) by 550 days.

(21) Appl. No.: 15/425,964

(22) Filed: Feb. 6, 2017

(51) Int. Cl.
| | | |
|---|---|---|
| *B64C 21/08* | (2006.01) | |
| *F04D 29/68* | (2006.01) | |
| *F01D 5/14* | (2006.01) | |
| *F01D 5/18* | (2006.01) | |
| *B64C 3/00* | (2006.01) | |
| *F04D 29/32* | (2006.01) | |

(52) U.S. Cl.
CPC .............. *B64C 21/08* (2013.01); *B64C 3/00* (2013.01); *F01D 5/147* (2013.01); *F01D 5/18* (2013.01); *F04D 29/324* (2013.01); *F04D 29/684* (2013.01); *F05D 2270/17* (2013.01)

(58) Field of Classification Search
CPC ........... B64C 3/00; B64C 21/04; B64C 21/08; F01D 5/147; F01D 5/18; F04D 29/324; F04D 29/684; F05D 2270/17
USPC .............................. 244/130, 200.1, 204, 207
See application file for complete search history.

(56) References Cited

U.S. PATENT DOCUMENTS

| | | | | | |
|---|---|---|---|---|---|
| 1,957,413 | A * | 5/1934 | Price | ..................... | B64C 23/005 244/208 |
| 2,376,834 | A * | 5/1945 | Thompson | .............. | B64C 21/04 137/625.12 |
| 2,841,344 | A * | 7/1958 | Stroukoff | ................ | B64C 23/00 138/39 |
| 5,813,625 | A * | 9/1998 | Hassan | .................... | B64C 23/06 244/17.11 |
| 6,142,425 | A * | 11/2000 | Armanios | ................. | B64C 9/38 239/562 |
| 6,368,059 | B1 * | 4/2002 | Maines | ..................... | B63H 1/15 415/914 |
| 6,622,973 | B2 * | 9/2003 | Al-Garni | ................ | B63H 25/40 244/206 |
| 7,637,462 | B2 * | 12/2009 | Pal | ........................ | B64C 27/001 244/199.2 |
| 2010/0243819 | A1 * | 9/2010 | Stanislas | ................. | B64C 21/04 244/207 |
| 2012/0068020 | A1 * | 3/2012 | Milde, Jr. | ............... | B64C 21/04 244/207 |
| 2013/0035808 | A1 * | 2/2013 | Golling | .................... | B64C 9/16 701/3 |
| 2016/0375987 | A1 * | 12/2016 | Shmilovich | ............ | B64C 3/185 244/207 |

* cited by examiner

*Primary Examiner* — Brady W Frazier
(74) *Attorney, Agent, or Firm* — Leavitt Eldredge Law Firm (57) ABSTRACT

A combination of an airfoil, turbine blade, or compressor blade with a flow separation control device includes an airfoil, a flow separation control device, and an injection system. The airfoil includes a body with an upper surface and a lower surface that extend from a leading edge to a trailing edge. The flow separation control device includes a plurality of openings on the upper surface of the body. The injection system includes an inlet tube, a pump in gaseous communication with the inlet tube, and a flow regulator in gaseous communication with the pump and the plurality of capillary tube.

9 Claims, 10 Drawing Sheets

FLOW SEPARATION CONTROL DEVICE FOR AN AIRFOIL

BACKGROUND

1. Field of the Invention

The present invention relates generally to flow separation control over an airfoil, compressor blade, turbine blade, and the like. More specifically, the present invention is related to a system and method to control flow separation utilizing a method of injecting fluid and/or gas into a separated boundary layer to reduce, if not eliminate, the boundary layer separation near the trailing edge of the airfoil during flight.

2. Description of Related Art

Figure 1:
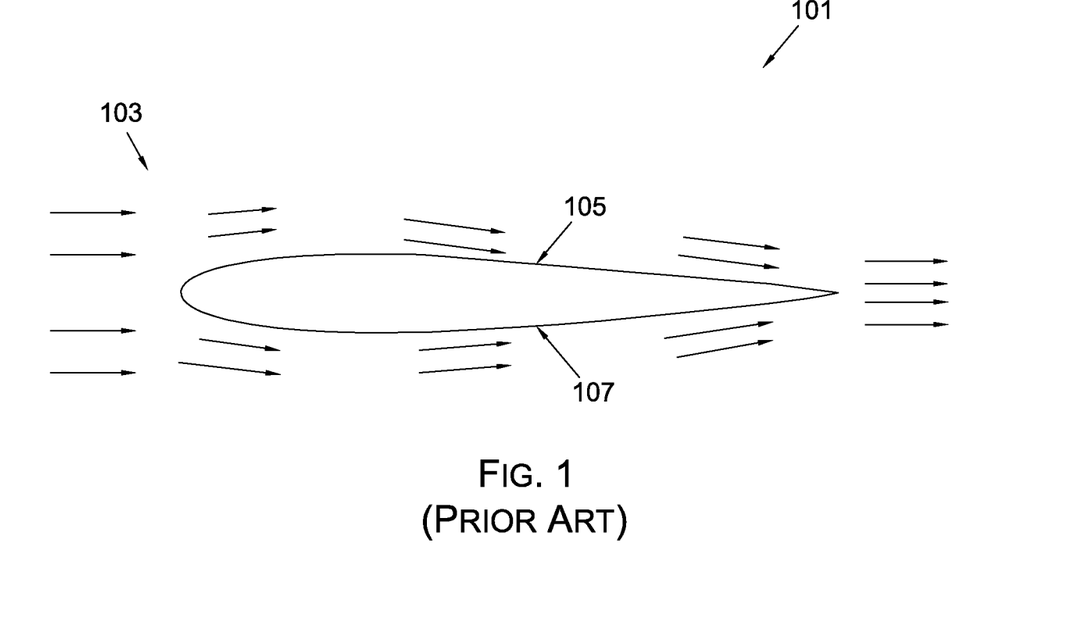
FIG. 1 is a side view of a conventional airfoil disposed within an airstream.
Figure 2:
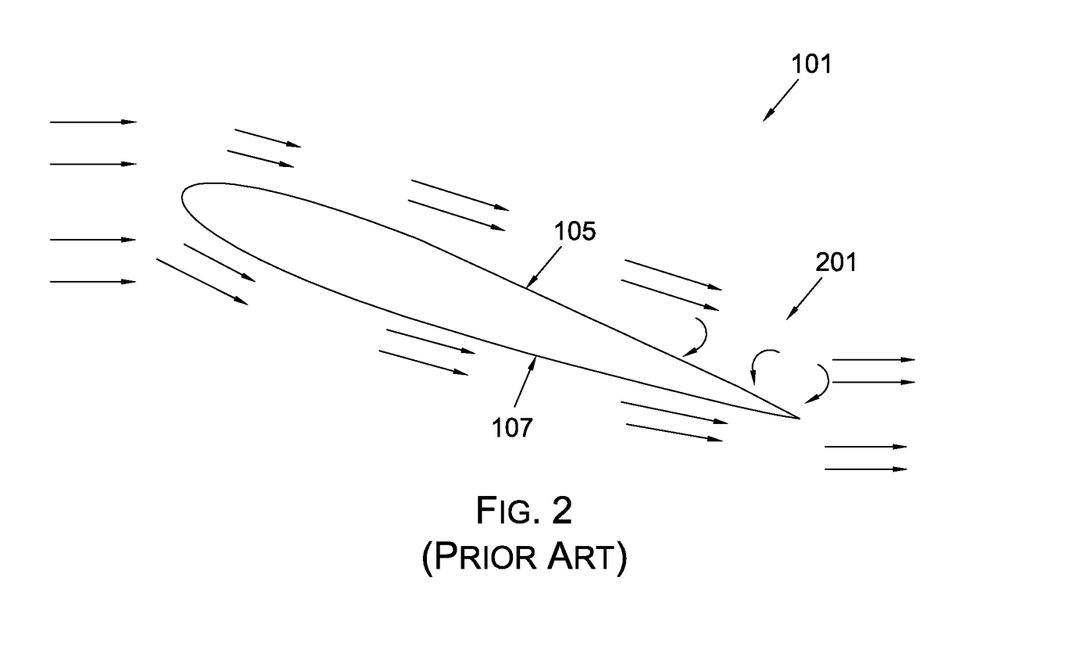
FIG. 2 is the airfoil of FIG. 1 with flow separation at the trailing edge.

Airfoils are well known in the art and are effective means to manipulated gas and/or fluid within an airstream. In one embodiment, the airfoil could be utilized to create lift for an aircraft, as depicted in FIGS. 1 and 2. FIG. 1 depicts a simplified cross-sectional side view of an airfoil 101 traveling through an airstream 103 that passes over a top surface 105 and bottom surface 107 of airfoil 101. It should be appreciated that the airfoil 101 could represent a wing of an aircraft. However, the same features are found in compressor blades, turbine blades, and the like.

One of the problems commonly associated with airfoil 101 is the limited use during different flight regimes. For example, FIG. 2 depicts a common problem associated with airfoil 101 during flight; specifically, flow separation 201 can occur near the trailing edge of the airfoil 101 during different flight regimes. It should be understood that flow separation 201 greatly reduces the efficiency of the airfoil, which in turn could result in catastrophic failure.

Accordingly, although great strides have been made in the area of airfoils, compressor blades, and/or turbine blades, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional airfoils. Specifically, the present invention is related to a system and method to control flow separation utilizing a method of injecting fluid and/or gas into a separated boundary layer to reduce, if not eliminate, the boundary layer separation near the trailing edge of the airfoil during flight. This feature is achieved by channeling fluid and/or gas through a porous membrane on the top surface of the airfoil and positioned to inject fluid and/or gas into and/or near the separated boundary layer. In one preferred embodiment, the fluid and/or gas is channeled through a plurality of capillary tubes extending through the skin of the airfoil. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 3-8 depicts various views of an airfoil 301 and flow control device 309 in accordance with one preferred embodiment of the present application. It will be appreciated that airfoil 301 overcomes one of more of the above-listed problems commonly associated with conventional airfoils. In the preferred embodiment, the airfoil 301 is an aircraft wing section; however, it will be appreciated that the teachings discussed herein could be utilized with other types of airfoils and should not be narrowly tailored for aircraft wings. For example, the features discussed herein could be utilized on compressor blades, turbine blades, and the like.

Figure 3:
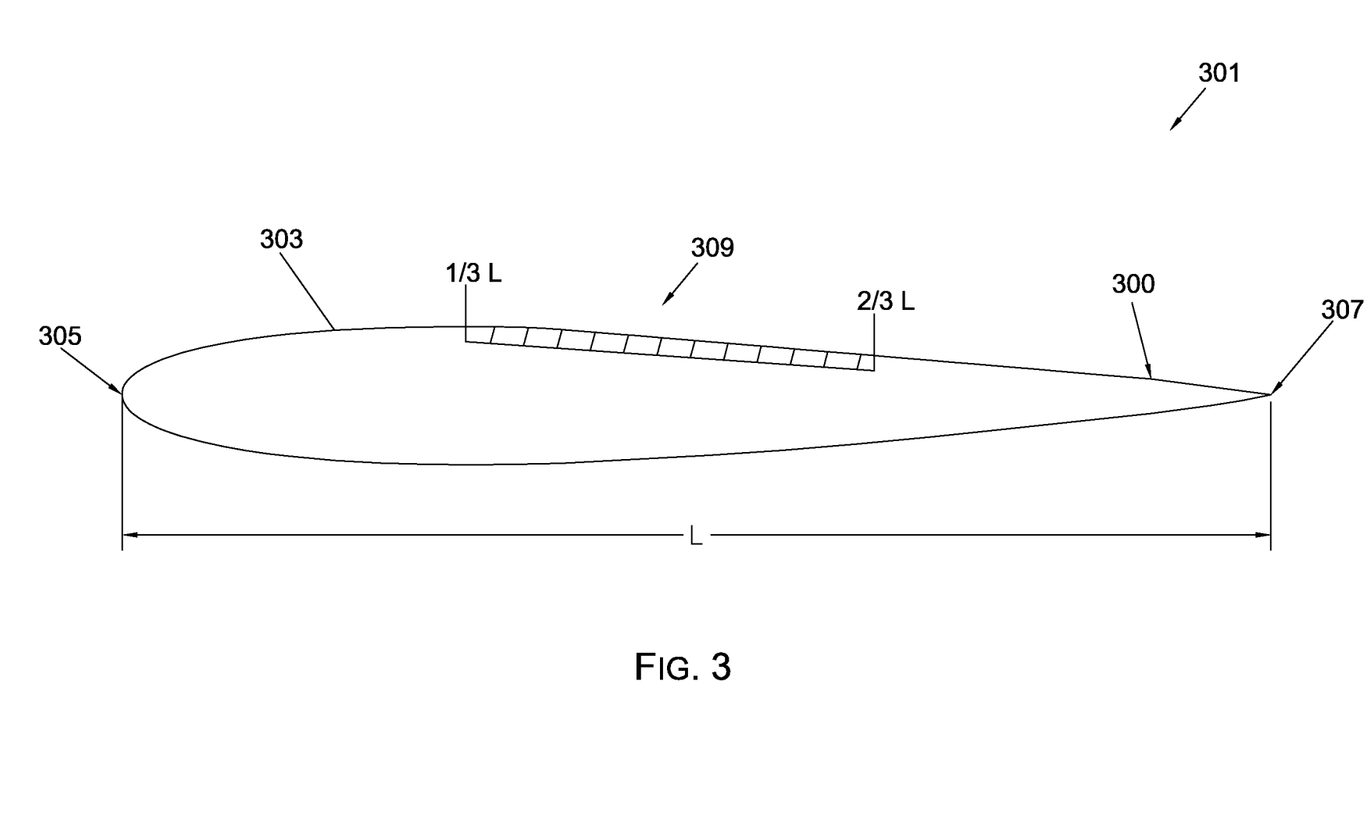
FIG. 3 is a side view of an airfoil with a flow control device in accordance with a preferred embodiment of the present application.

In the contemplated embodiment, airfoil 301 includes one or more of a contoured body 303 having an upper surface 300 and a lower surface 302 that extends from a leading edge 305 to a trailing edge 307.

Figure 4A:
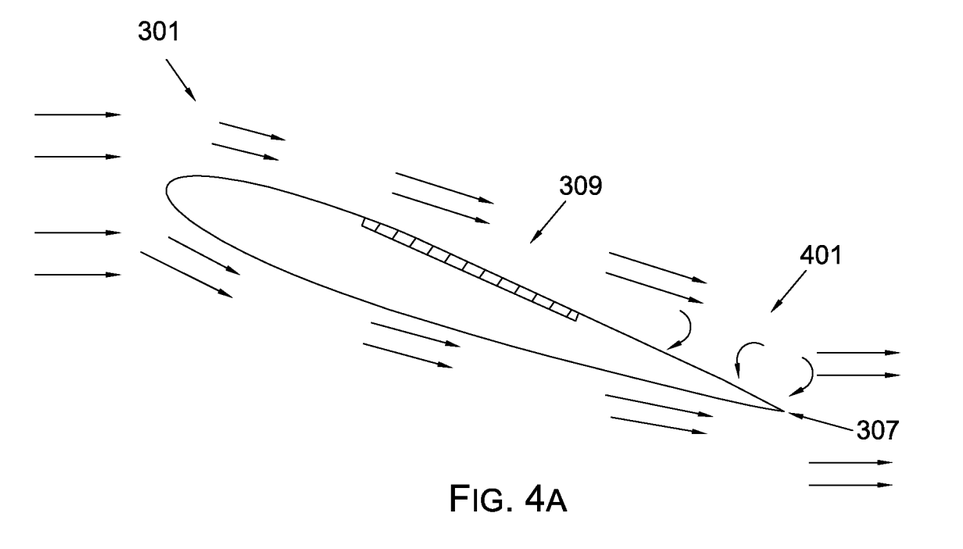
FIGS. 4A and 4B are side views of the airfoil of FIG. 3 during use.
Figure 4B:
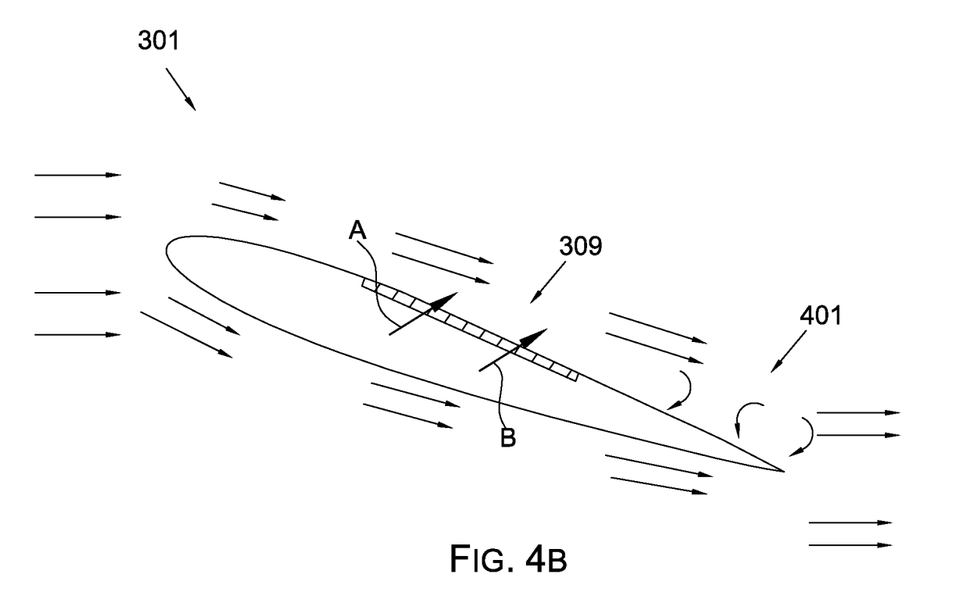

One of the unique features believed characteristic of the present invention is the use of a separation flow control device 309 configured to manipulated the airflow around the upper surface 300, as depicted in FIGS. 4A and 4B, during different flight regimes. To achieve this feature, the flow control device 309 injects air and/or fluid within the airstream passing over the upper surface 300, as depicted with arrow "A" and "B" of FIG. 4B. It should be understood that the process of injecting the fluid and/or air into the turbulent flow separation 401 causes the separated boundary layer to partially, if not fully, reattach to the upper surface 300, which in turn increases the airfoil effective use during different flight regimes.

Referring back to FIG. 3, it has been found that the porous section of the flow control device 309 extends from ⅓ to ⅔ of the chord length, as indicated by "⅓L" and "⅔L," respectively. Within this confined area, fluid and/or gas is injected into the airstream passing over the upper surface 300 as discussed above. Although found effective within this section of the chord length, it will be appreciated that other embodiments could include sections with different chord lengths.

Figure 5:
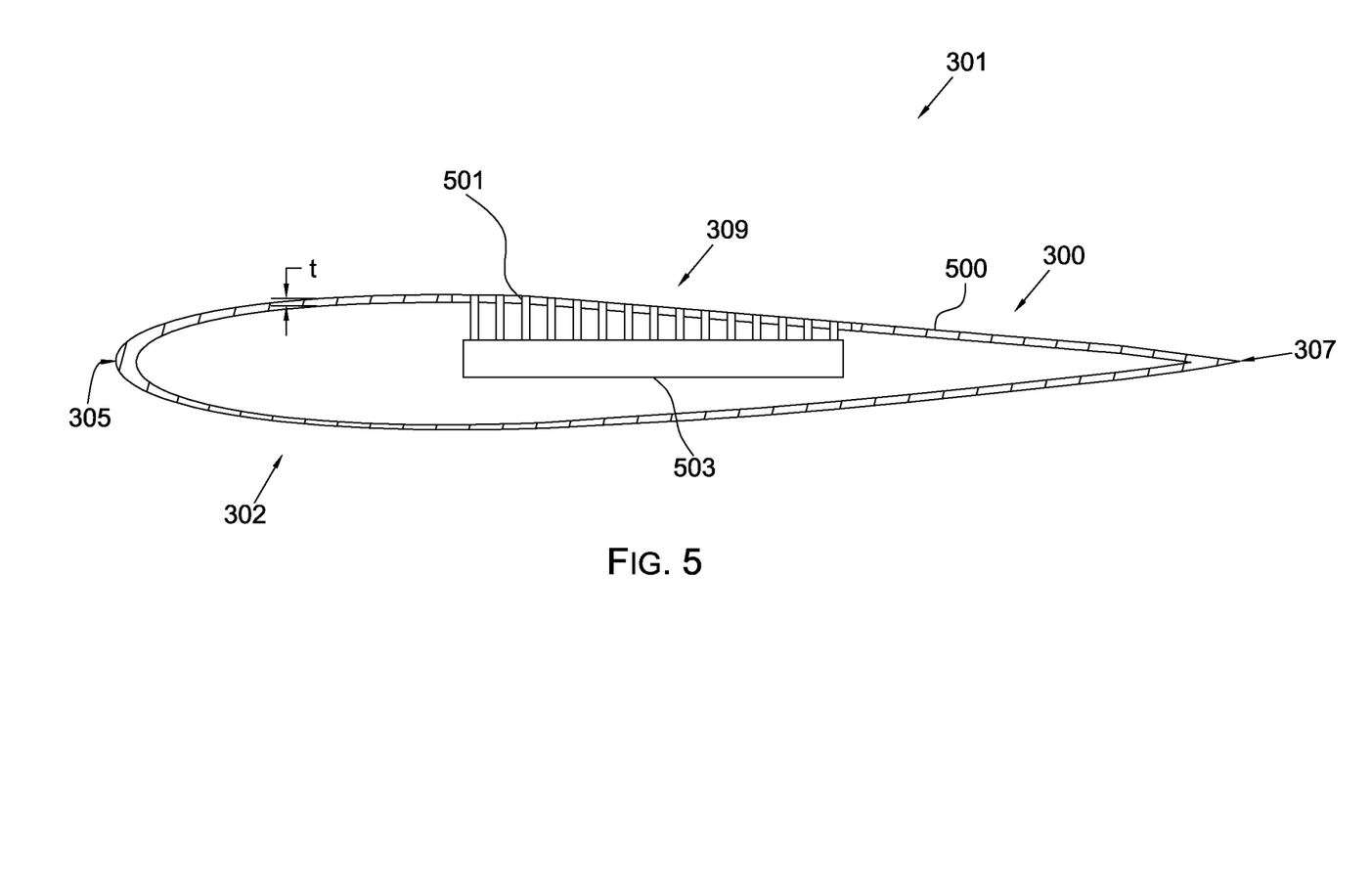
FIG. 5 is a side cross-sectional view of the airfoil of FIG. 3.
Figure 6:
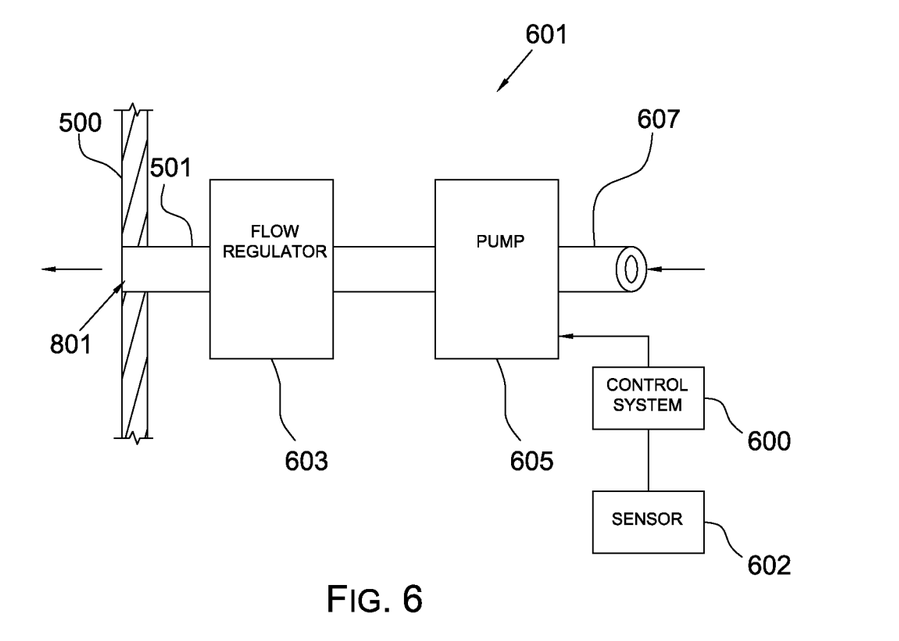
FIG. 6 is a simplified schematic of the flow control device of FIG. 3.

In FIGS. 5 and 6, respective cross-sectional and simplified schematics of the airfoil and flow control device are shown. In one preferred embodiment, the control device 309 could include a plurality of capillary tubes 501 that extend through the thickness "t" of the skin 500 of the airfoil. The tubes 501 are in gaseous and/or fluid communication with a common reservoir 503. As depicted in FIG. 6, the plurality of capillary tubes include an opening 801 that can either remain flush with or extend from upper surface 300. Although depicted extending relatively perpendicular to the skin, it will be appreciated that the capillary tubes could be oriented at an angle relative to the skin surface. This feature would inject the fluid and/or gas at an angle relative to the skin surface to further reduce the flow separation during different flight regimes.

The flow control device 309 could include an injection system 601 having one or more of a pump 605, and/or similar means, configured to channel fluid and/or gas through an inlet tube 607 to a flow regulator 603. The flow regulator 603 is regulates the amount of fluid and/or gas channeled through the capillary tubes 501.

In one embodiment, the inlet tube 607 could be in fluid and/or gaseous communication with the airstream passing at a different location around the aircraft or on the lower surface of the airfoil. This feature is shown in FIG. 9, wherein a side view of the airfoil is shown with tube 607 ending at the lower surface 302.

Figure 9:
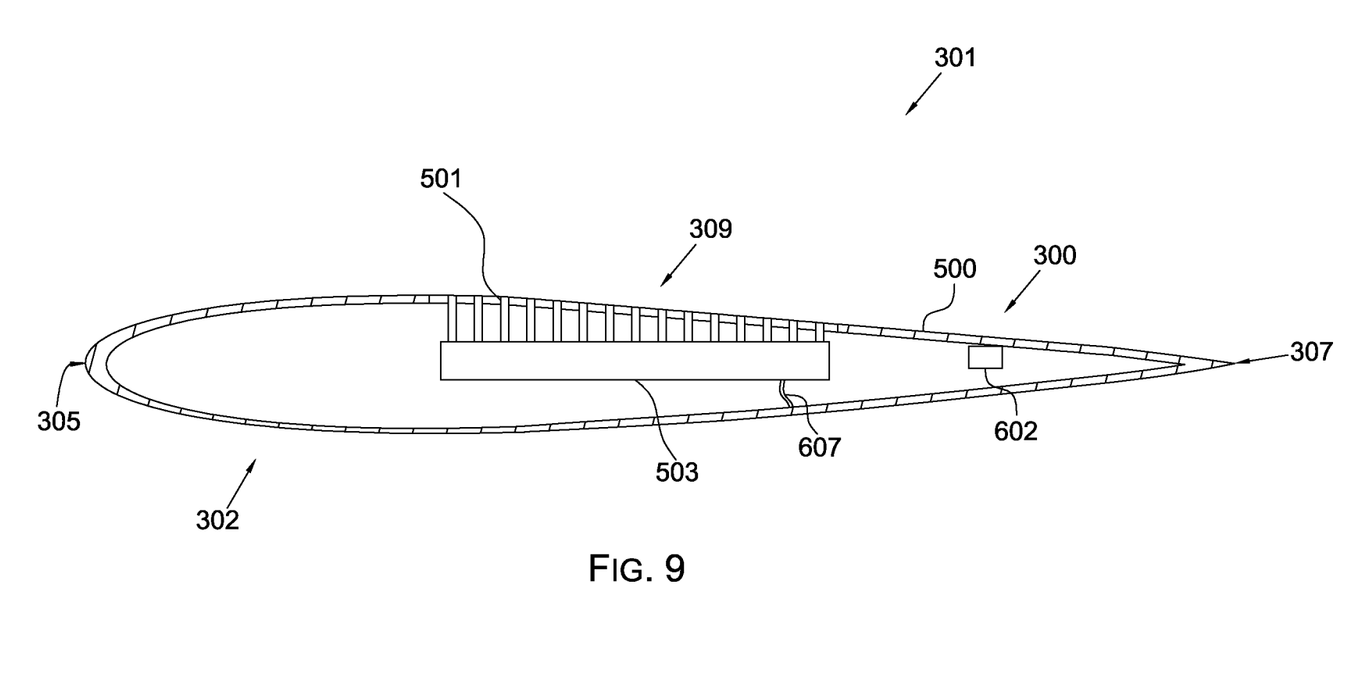
FIG. 9 is a side view of an alternative embodiment of the airfoil of FIG. 3.

Further, as depicted in FIGS. 6 and 9, control system 600 and sensor 602 could also be in data communication with the injection system 601 for sensing flow separation 401 and regulating the flow rate of fluid and/or gas passing through capillary tube 501. For example, a larger flow separation 401 could require a greater flow rate of fluid and/or gas passing through the capillary tubes than a smaller flow separation 401. Accordingly, the system 601 provides effective means for flow separation control, and in some embodiments could provide autonomous control of the boundary layer separation. in the exemplary embodiment, the sensor is position on the upper surface of the airfoil near the flow separation area; however, it will be appreciated that the sensor could be positioned at various locations and should not be limited to the illustrated location.

Figure 7:
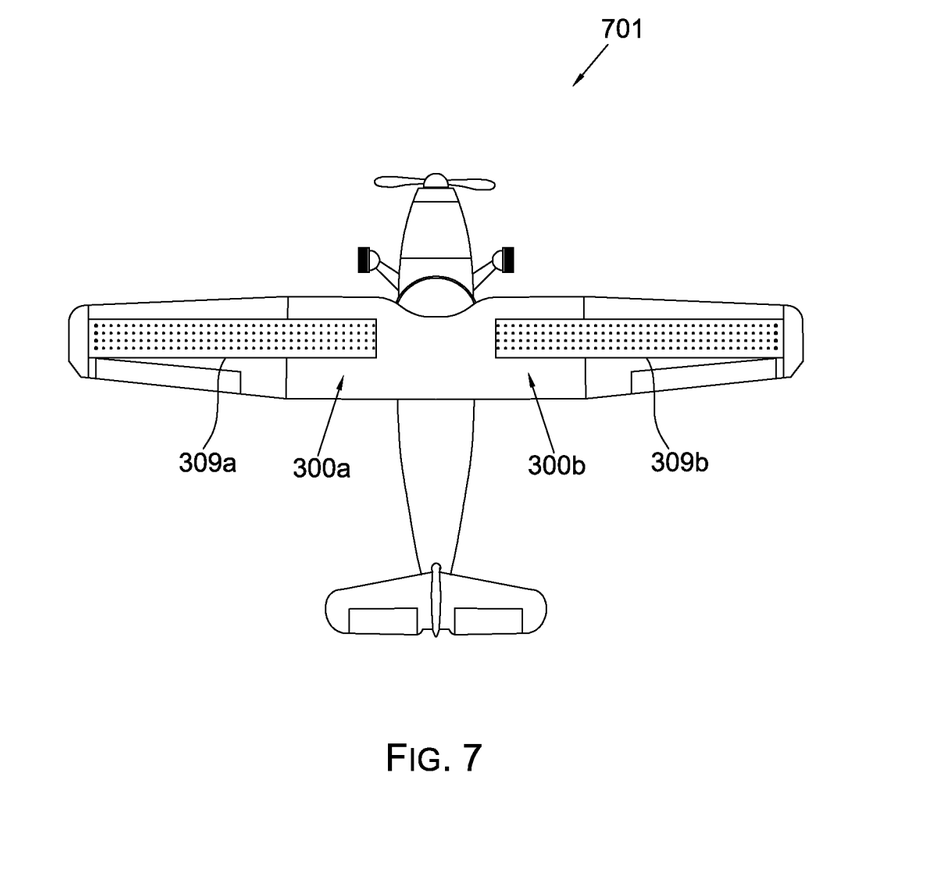
FIG. 7 is a top view of an aircraft utilizing the system of FIG. 3.
Figure 8:
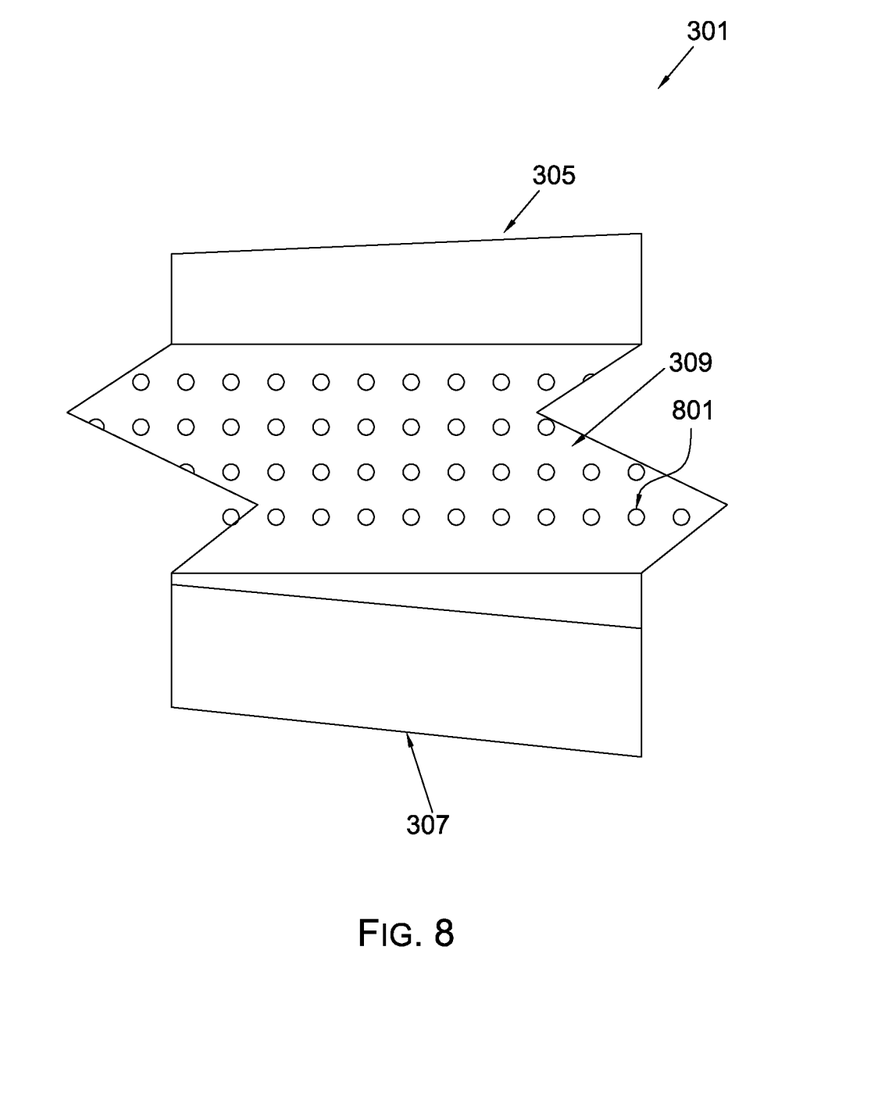
FIG. 8 is a partial enlarged view of the airfoil of the aircraft of FIG. 7.

Referring now to FIGS. 7 and 8, top views of an aircraft 701 is shown utilizing the airfoil 301 in accordance with the embodiments discussed above. Specifically, the aircraft 701 comprises of a wing with flow control devices 309a, 309b on respective upper surfaces 300a, 300b of the aircraft's wing. As shown in FIG. 8, a plurality of openings 801 extend through the skin of the airfoil. The number of opening and associated capillary tubes are a design choice along with the diameter size of each tube.

Figure 10:
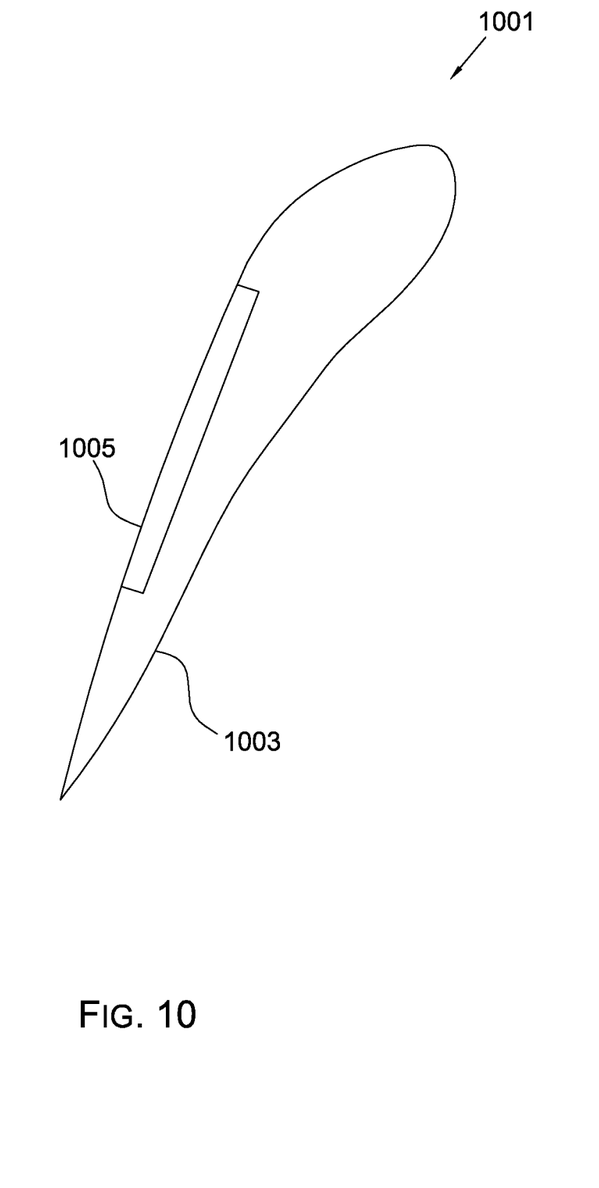
FIG. 10 is a front view of a compressor blade utilizing the system of FIG. 3.
Figure 11:
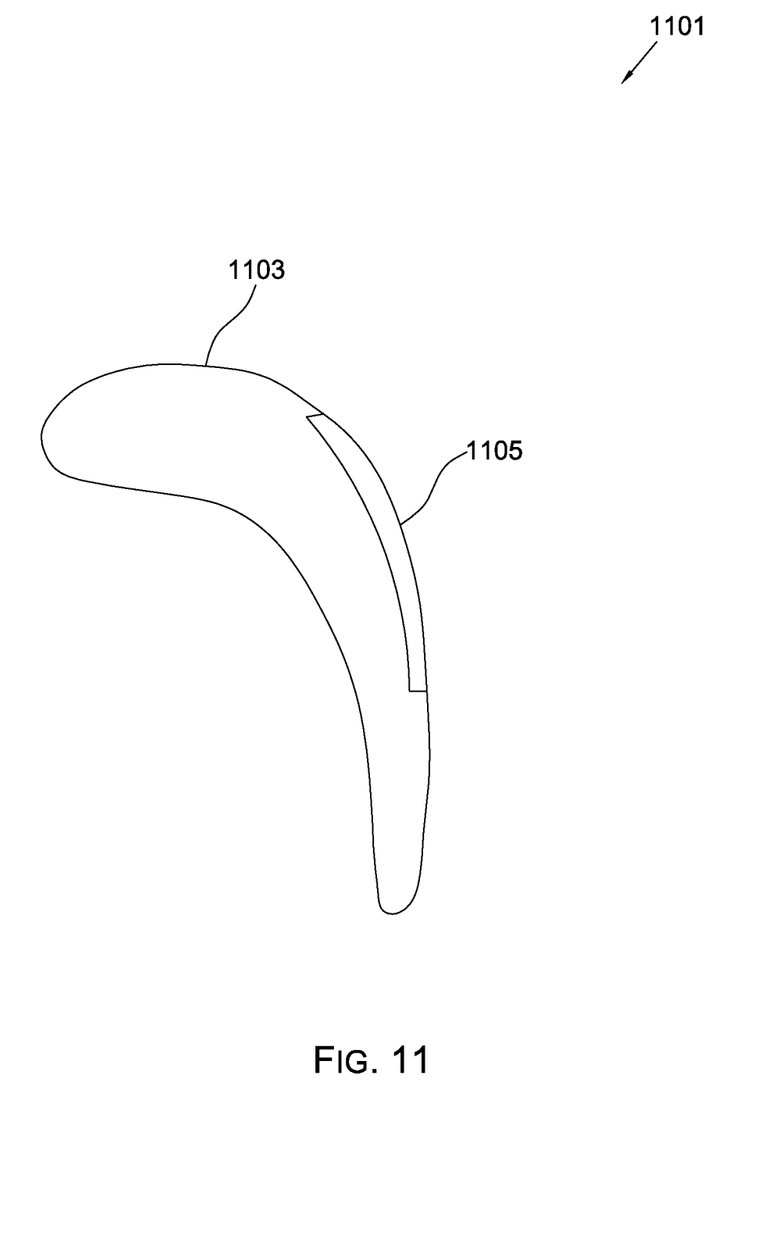
FIG. 11 is a side view of a turbine blade utilizing the system of FIG. 3.

FIGS. 10 and 11 illustrate front views of respective compressor blade 1001 and turbine blade 1101 utilizing the features discussed herein. Specifically, the compressor blade 1001 includes a contoured body 1003 having a flow separation control device 1005, while turbine blade 1101 has a contoured body 1103 with a flow separation control device 1105. It should be appreciated that blades 1001 and 1101 include one or more of the features discussed above and incorporates the same.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination of an airfoil and a flow separation control device, comprising:
   the airfoil, having:
      a body with an upper surface and a lower surface that extend from a leading edge to a trailing edge, the upper surface being contoured from the leading edge to the trailing edge, the upper surface is on an opposing side of the body than the lower surface; and
   the flow separation control device, having:
      a plurality of openings extending through a skin on the upper surface of the body;
      a plurality of capillary tubes in gaseous communication with the plurality of openings; and
      a reservoir positioned within the body and in gaseous communication with the plurality of capillary tubes, the plurality of capillary tubes extending from the plurality of openings and into the reservoir;

an injection system, having:
- an inlet tube in gaseous communication with an airstream passing over the lower surface of the body, the inlet tube extending from the lower surface to the plurality of openings via the reservoir;
- a pump disposed within the body and configured to direct air from the airstream passing over the lower surface to the airstream passing over the upper surface via the inlet tube to the reservoir, to the plurality of openings; and
- a flow regulator in gaseous communication with the pump and the plurality of capillary tubes;

wherein the pump directs gas from the inlet tube to the plurality of capillary tubes;

wherein the flow regulator regulates the flow rate of gas passing through the plurality of capillary tubes; and wherein the plurality of openings reduces a flow separation in the portion of the airstream passing over the upper surface of the body.

2. The combination of claim 1, wherein the airfoil is a wing of an aircraft.

3. The combination of claim 2, wherein the flow separation control device extends the longitudinal length of the wing.

4. The combination of claim 3, wherein a porous section of the flow control device extend from a ⅓ chord length to a ⅔ chord length of the airfoil.

5. The combination of claim 1, wherein the plurality of openings having a circular shaped dimension.

6. The combination of claim 1, wherein the plurality of capillary tubes are oriented at an angle relative to the upper surface of the body.

7. The combination of claim 6, wherein the gas exits at an angle relative to the upper surface of the body.

8. The combination of claim 1, wherein the inlet tube is in fluid communication with a portion of the airstream passing over the lower surface of the airfoil.

9. The combination of claim 1, wherein the plurality of capillary tubes extend from a ⅓ chord length to a ⅔ chord length of the airfoil.

* * * * *